(12) United States Patent
Honguu et al.

(10) Patent No.: US 6,509,924 B2
(45) Date of Patent: Jan. 21, 2003

(54) VIDEO TELEPHONE WITH AUTOMATIC ANSWERING FUNCTION

(75) Inventors: Naoaki Honguu, Nara (JP); Manabu Toda, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 69 days.

(21) Appl. No.: 09/847,312

(22) Filed: May 3, 2001

(65) Prior Publication Data

US 2002/0015091 A1 Feb. 7, 2002

(30) Foreign Application Priority Data

Jun. 28, 2000 (JP) ........................................ 2000-194524

(51) Int. Cl.⁷ ........................... H04N 7/14; H04M 11/00
(52) U.S. Cl. ............................... 348/14.06; 379/93.17; 379/88.13
(58) Field of Search ........................ 348/14.01–14.07, 348/14.11; 379/93.08, 93.09, 93.17, 93.23, 88.13, 88.11

(56) References Cited

U.S. PATENT DOCUMENTS 5,896,165 A * 4/1999 Rao ........................ 348/14.06
6,377,664 B2 * 4/2002 Gerszberg et al. ....... 348/14.11

FOREIGN PATENT DOCUMENTS

| JP | 63-316966 | 12/1988 |
| JP | 7-30873 | 1/1995 |
| JP | 2000-35845 | 2/2000 |

* cited by examiner

Primary Examiner—Wing Chan
(74) Attorney, Agent, or Firm—Nixon & Vanderhye, P.C.

(57) ABSTRACT

The invention makes efficient use of the function of a video telephone to store incoming calls. A caller image is stored in a display storage portion during a call, and the display of the image with an image display portion is continued after the communication. When the user sees the display portion, the user can confirm with one glance from who a video telephone communication was received while the user was out. It is also possible to store caller images while successively increasing the number of partitions into which the screen of the image display portion is partitioned whenever an image is recorded, and successively increasing the empty display space.

11 Claims, 6 Drawing Sheets

FIG. 4A
1234567890*#
*1234567890*#*
ABCDEFGHIJKL
*ABCDEFGHIJKL*
abcdefghijkl
*abcdefghijkl*

FIG. 4B
13579*
*13579*
ACEGIK
*ACEGIK*
acegik
*acegik*

FIG. 4C
| 13579* *13579* ACEGIK *ACEGIK* acegik *acegik* | 13579* *13579* ACEGIK *ACEGIK* acegik *acegik* |

FIG. 4D
| 13579* ACEGIK acegik | 13579* ACEGIK acegik |

FIG. 4E
| 13579* ACEGIK acegik | 13579* ACEGIK acegik |
| 13579* ACEGIK acegik | |

FIG. 4F
| 13579* ACEGIK acegik | 13579* ACEGIK acegik |
| 13579* ACEGIK acegik | 13579* ACEGIK acegik |

FIG. 4G
| 1379 ACGI acgi | 1379 ACGI acgi |
| 1379 ACGI acgi | 1379 ACGI acgi |

FIG. 4H
| 1379 ACGI acgi | 1379 ACGI acgi | 1379 ACGI acgi |
| 1379 ACGI acgi | | |

FIG. 4I
| 1379 ACGI acgi | 1379 ACGI acgi | 1379 ACGI acgi |
| 1379 ACGI acgi | STORE FIFTH IMAGE | |

VIDEO TELEPHONE WITH AUTOMATIC ANSWERING FUNCTION

BACKGROUND OF THE INVENTION

1. Field of the Invention

The present invention relates to a video telephone which is capable of communicating with a calling side via images as well as audio signals, and has an automatic answering function of automatically responding to an incoming call.

2. Description of the Related Art

Conventionally, telephones provided with an automatic answering function are in widespread use among telephones for audio communication. With the automatic answering function, the telephone responds automatically to an incoming call, and records a message of the calling side on magnetic tape or the like. When it is possible to receive the caller number (that is, the telephone number of the calling side), the number of the caller can be stored together with the message of the calling side, and even if the calling side terminates the call without responding to the automatic answering function, it is possible to store the caller number only. The user of such a telephone having an automatic answering function can then reproduce (play back) recorded message that have been stored with the automatic answering function, at a later time. Some apparatuses are equipped with a display device, with which the recorded messages can be displayed as a list. Although it takes a long time to reproduce sequentially a plurality of messages stored on a magnetic tape, with such an apparatus it is possible to select a recorded message from the list to be quickly reproduced, for example, by fast-forwarding the magnetic tape. The display device can display the telephone number of the caller, and, in the case where the telephone is equipped with a telephone book function in addition to the automatic answering function, the name etc. recorded by the telephone book function in association with the telephone number. Thus, looking at the information displayed by the display device, the user of the telephone can select a recorded message to be reproduced.

Regarding a video telephone which allows telephone communication with images as well as audio signals, for example, Japanese Unexamined Patent Publication JP-A 7-30873 (1995) discloses a conventional telephone provided with an automatic answering function, with which messages including images recorded in response to an automatic answering function can be reproduced. In this conventional video telephone, messages and images received from a calling side while the user is out can be stored on random access hard disk. A large amount of storage space is necessary to continuously store images, so that this conventional video telephone is equipped with a mode in which only audio signals are stored without storing images, a mode in which only the initial screen is recorded, a mode in which a specific screen associated with a command operation signal from the calling side is stored, a mode in which a screen is stored every predetermined period of time, and a mode in which only the final screen is stored. In this conventional video telephone, images and audio signals received from the calling side during automatic answering with the automatic answering function are stored, but the reproduction of the stored information is similar as with the automatic answering function in telephones for audio communication. That is to say, when the reproduction function is activated by a predetermined switching operation, a list of the recorded messages is displayed. This list displays, in a table, the telephone number and name of the caller, the time, and the storage mode indicating whether the stored message is audio only or audio and images. When the user selects a number from this list, the stored information corresponding to this number is reproduced. When images have been stored, then the stored images are reproduced. Although it is not explicitly mentioned in the above-noted publication, when there is a message recorded in response to a call with the automatic answering function in a regular telephone for audio that has an automatic answering function, then a lamp or the like provided on the telephone blinks. Thus, when the user comes home and sees the lamp, the user can easily determine whether messages have been recorded while he was out, and decide whether to perform the operation for reproducing the stored messages.

Furthermore, Japanese Unexamined Patent Publication JP-A 63-316966 (1988) discloses a conventional video telephone equipped with a telephone book function. This publication describes the partitioning of the display screen to display a plurality of images, in order to carry out selection among a plurality of registered entries.

As has been explained with regard to JP-A 7-30873, in conventional telephones having an automatic answering function, the user cannot check who the caller is or from which a call has been received while the user was out, unless reproduction of recorded messages is carried out. When the telephone is not a video telephone but a telephone with audio capability only, and when the caller's audio message is reproduced continuously after recording it, then, when the user knows the caller, the user can recognize the caller by his or her voice even without performing the reproduction operation. However, there is the disadvantage that, when the recorded message is repeatedly reproduced while the user is out, it can be heard and causes noise pollution to the neighborhood, so that this method has found no practical use.

In telephones capable of receiving the caller's telephone number, it is possible to identify the caller from the displayed telephone number, and, when the caller's name has been stored in association with the telephone number, to display the name matching the caller's telephone number. Therefore, when the user performs the reproduction operation with a regular automatic answering function, a list of the telephone calls received while the user was out is displayed. Still, the telephone number is only assigned to the caller's telephone, and is not associated with a specific person. In case of mobile phones or the like, the chances are high that a telephone number is related closely to a specific person, but when the user knows the caller, then the caller can be faster identified by his or her voice. However, in regular telephones, when one telephone line is installed for one household, for example, and when the telephone number of this telephone line is displayed, the possibility that the call is from this household is high, but in case of a three-member family of father, mother and child, it is not possible to specify the caller, even when the telephone number and a name associated with that number are displayed.

Furthermore, JP-A 63-316966 discloses that the screen is partitioned into a number of partitions as specified with the telephone book function, and the plurality of images stored in the memory are displayed simultaneously. However, this publication does not mention whether the number of partitions can be changed or not, and even assuming that it can be changed, it does not mention how it could be changed. Consequently, when the number of partitions is too large compared to the number of still images to be displayed, then the images have to be displayed in very small size and become difficult to recognize, even though there is empty space. On the other hand, when the number of partitions is small, then it may not be possible to display all images to be displayed, and the perspicuity of the display suffers.

SUMMARY OF THE INVENTION

It is an object of the invention to provide a video telephone having an automatic answering function, which makes efficient use of the video telephone's function and makes it easy to identify callers who have responded to the automatic answering function.

The invention provides a video telephone having an automatic answering function in which automatic answering is made in response to an incoming call and at least an image of a calling side is reproducibly stored, the video telephone comprising:

display storage means for storing image display information during automatic answering; and display continuation means for controlling the display storage means such that image display is continued after a video telephone communication has been terminated.

According to the invention, the video telephone having an automatic answering function can automatically answer to an incoming call and at least reproducibly store an image of the calling side, and comprises display storage means and display continuation means. The display storage means displays images and stores image display information during automatic answering. The display continuation means controls the display storage means such that image display is continued after a video telephone communication has been terminated. Since the image display is continued even after a video telephone communication using the automatic answering function has been terminated, the user can easily identify the caller by looking at the image. Because the image is displayed continuously, it is possible to avoid the problems that occur when a voice message is repeatedly reproduced, namely that the content of the message can be heard by the neighborhood and causes noise pollution. Furthermore, although it is not possible to specify a member of the household by a telephone number even though it may be possible to specify the household by the telephone number, with the invention, it becomes easy to specify a specific person when, for example, the face of the caller is displayed on the image display.

Furthermore, according to the invention, the video telephone automatically answers to an incoming call with the automatic answering function and an image of the caller is stored The stored image can be continuously displayed even after the automatically answered video telephone communication has been finished, so that the calling side image can be displayed without any special operation by the user, and when the user returns home after being out, the user can immediately recognize the caller.

In the invention it is preferable that the display continuation means controls the display storage means such that the display storage means stores and displays a received final image frame.

According to the invention, since the final image frame is stored and displayed by the control of the display continuation means controls, after the video telephone communication is finished, the final image frame is displayed with the result that the control for continuous display is simplified.

Furthermore, according to the invention, the final image frame from the calling side of a video telephone communication that has been answered automatically by the automatic answering function is displayed continuously, so that it is sufficient to display the content displayed by the video telephone function continuously without change after the communication has been finished, which makes it possible to simplify the control of the display storage means.

In the invention it is preferable that the video telephone further comprises display manipulation means for, in the case where a plurality of calls have been answered automatically and there is no empty display space for an image to be added to a continuous image display, in a storage space of the display storage means, producing available display space for the image to be added, in the display storage means by manipulating images received so far by automatic answering so as to reduce an information amount of the images, to store and display the image in the produced display space.

According to the invention, when a plurality of calls have been automatically answered, the images for the plurality of calls can be stored with the display storage means and displayed continuously. When there is no empty display space for an image to be added, in the storage space of the display storage means, then the display manipulation means produces available display space for the image to be added, in the display storage means by manipulating the images received so far by automatic answering so as to reduce the information amount of the images, to store and display the image to be added, in the produced display space, so that all of the images for a plurality of calls can be displayed at one time.

Furthermore, according to the invention, when a plurality of calls are automatically answered, the images for the plurality of calls are stored in the display storage means, and can be continuously displayed.

In the invention it is preferable that the display manipulation means reduces the information amount by directly culling image data stored in the display storage means.

According to the invention, the display manipulation means reduces the information amount by directly culling image data stored in the display storage means, and produces new available display space, so that it is possible to reduce the displayed images by culling as well as production of new available space.

Furthermore, according to the invention, image data stored in the display storage means are directly culled to produce new available display space, and images of a plurality of callers are displayed, so that it is possible to attain an at-a-glance-display by reducing the displayed image data while increasing the displayed number of images and fitting a plurality of displays into the same screen.

In the invention it is preferable that the display manipulation means rearranges the displayed images after reducing the information amount thereof.

According to the invention, the display manipulation means rearranges the displayed images when reducing the information amount of the image already stored in the display storage means, so that, in addition to the reduction of the information amount, it is possible to display a plurality of images such that they are easy to grasp.

Furthermore, according to the invention, when a plurality of images are displayed, the information amount is reduced and the displayed images are rearranged, so that it is possible to identify a plurality of callers by arranging the images in accordance with the reduced information amount.

It is preferable that the images are rearranged in a chronological order.

According to the invention, the images can be displayed in chronological order, so that the user can easily identify the chronological order in which the displayed images have been stored.

In the invention, it is preferable that the display manipulation means partitions the display space in a predetermined direction which is either a vertical direction or a horizontal direction into n partitions to display a plurality of m images, and in the case where a (m+1)$^{th}$ image newly received by the automatic answering function is to be displayed, the display manipulation means compresses all of the plurality of images by n/(n+1) to partition the display space into n+1 partitions with respect to the predetermined direction to enable the (m+1)$^{th}$ image to be displayed.

According to the invention, when the number of displayed images is increased, the compression of the images already stored with the display storage means and continuously displayed is halted at the necessary minimum, and using the display space efficiently, the displayed images can be easily identified, and it is possible to display all images together simultaneously.

Furthermore, according to the invention, when a plurality of caller images are being displayed and one image is to be added, the necessary compression in order to add that new image is performed, so that it is possible to efficiently use the display space in order to display a plurality of images.

In the invention it is preferable that the display manipulation means partitions the display space in either a vertical direction or a horizontal direction into n partitions to display a plurality of m images, and in the case where a (m+1)$^{th}$ image newly received by the automatic answering function is to be displayed, the display manipulation means produces available display space for the (m+1)$^{th}$ image in the display storage means by culling, with respect to the direction, one of n data points of each of the m images to compress the image in size to n/(n+1) in said direction, and partitioning the display space in that direction into (n+1) partitions, and compresses the (m+1)$^{th}$ image to the same size as that of the m images compressed to n/(n+1) in size, to store and display the compressed (m+1)$^{th}$ image in the available display space.

According to the invention, when displaying an image received by a further automatic answering process, the compression of the images already stored with the display storage means and continuously displayed is halted at the necessary minimum, and compressing the newly received images, it becomes easy to identify the displayed images, using the display space of the display storage means efficiently, and it is possible to display all images together simultaneously and continuously. Moreover, by culling the image data, it is possible to reduce the information amount of the images easily and quickly.

In the invention it is preferable that the display manipulation means partitions the display space into a preset maximum number of display partitions or less.

According to the invention, the display manipulation means does not partition the display space beyond a preset maximum number of display partitions, so that it is possible to avoid display of images that are too small, which occurs when the images displayed continuously by the display storage means are too small, so that the user cannot identify the caller by looking at the images, and to maintain the advantageous aspect of identification of the caller by displaying images.

Furthermore, according to the invention, the display space is not partitioned beyond a maximum number of partitions, so that it is possible to prevent the display of a number of images that is so large that the at-a-glance-display is harmed.

In the invention, it is preferable that the display space is rectangular, with horizontal sides thereof being longer than vertical sides thereof, and the partitioning of the display space begins with partitioning in horizontal direction.

In the invention, it is preferable that the partitioning of the display space is carried out in the horizontal direction and the vertical direction in alternation.

According to the invention, beginning with horizontal partitioning of the display space, which is rectangular and whose horizontal sides are longer than its vertical sides, the image that is already displayed, and which is rectangular and whose horizontal sides are longer than its vertical sides, is compressed in horizontal direction and displayed in the partitioned display space, so that the images displayed after the partitioning of the image space can be visually grasped easier than when beginning with vertical partitioning of the display space, and vertically compressing the image that is already displayed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
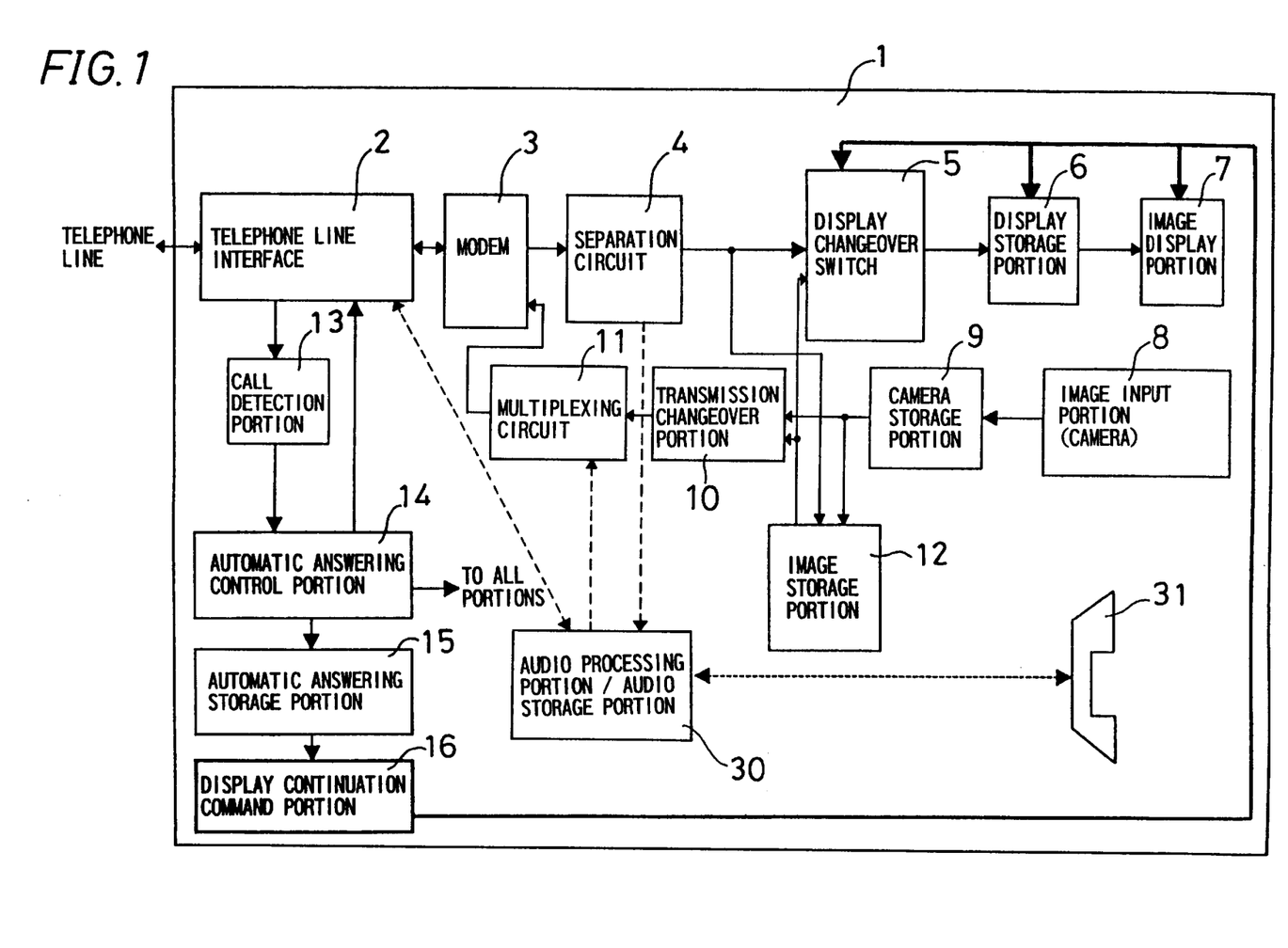
FIG. 1 is a block diagram illustrating a general electrical configuration of a video telephone 1 in accordance with an embodiment of the invention.

FIG. 1 is a block diagram illustrating a general electrical configuration of a video telephone 1 in accordance with an embodiment of the invention. The video telephone 1 includes a telephone line interface 2, a modem 3, a separation circuit 4, a display changeover switch 5, a display storage portion 6, an image display portion 7, an image input portion 8, a camera storage portion 9, a transmission changeover portion 10, a multiplexing circuit 11, an image storage portion 12, a call detection portion 13, an automatic answering control portion 14, an automatic answering storage portion 15, a display continuation command portion 16, an audio processing portion/audio storage portion 30, and a handset 31.

The telephone line interface 2 performs two-line-four line-conversion. The modem 3, which is constituted by a semiconductor integrated circuit, converts analog signals on a telephone line into digital data, which it outputs to the separation circuit 4, and converts digital data outputted from the multiplexing circuit 11 into an analog signal, which it outputs to the telephone line via the telephone line interface 2. The separation circuit 4 is constituted by a logic semiconductor IC and a digital signal processor (also abbreviated as "DSP" in the following). The separation circuit 4 separates the digital data outputted from the modem 3 into received image data, received audio data and a control signal, while referencing a synchronization signal and data classification flags, and also includes a channel decoder, an error correction circuit, an image decoder and an audio decoder. The display changeover switch 5 is processed in the DSP of the separation circuit 4, and selects the image data from the separation circuit 4 and the image storage portion 12, which it outputs to the display storage portion 6. The display storage portion 6 is constituted by a random access memory (also abbreviated as "RAM" in the following), and stores the image data corresponding to one screen, which it can output to the image display portion 7. The image display portion 7 contains a liquid crystal display (also abbreviated as "LCD" in the following), a semiconductor integrated circuit serving as an LCD driver, and a backlight. In this embodiment, the display storage means is constituted by the display storage portion 6 and the image display portion 7. The image input portion 8, which is constituted by a CCD camera or the like, captures, for example, the image of a user using the video telephone 1 for video telephone communication. The camera storage portion 9 is constituted by a RAM storing images from the image input portion 8. Also the transmission changeover portion 10 is processed in the DSP of the separation circuit 4, and selects the image data from the camera storage portion 9 and the image storage portion 12, which it outputs to the display storage portion 6.

The multiplexing circuit 11 is a channel encoder that encodes the image data that has been inputted from the transmission changeover portion 10, and that serve as the transmitted data, encodes the audio data that has been inputted from the audio processing portion/audio storage portion 30, adds an error correction code, multiplexes the data with data classification flags, control signals and synchronization signals, and outputs the data to the modem 3. The image storage portion 12 is a storage means, which records images from the image input portion 8 through the camera storage portion 9 and records images of callers that have been received from the telephone line over the telephone line interface 2, the modem 3, and the separation circuit 4. The image storage portion 12 is constituted by a RAM or a flash ROM, which is a rewritable read-only memory, and is controlled by the DSP of the separation circuit 4. The output of the image storage portion 12 is image displayed through the display changeover switch 5, the display storage portion 6 and the image display portion 7, or it is sent to the telephone line via the transmission changeover portion 10, the multiplexing circuit 11, the modem 3 and the telephone line interface 2.

The audio-processing-portion/audio-storage-portion 30 includes a memory for storing audio information, a D/A converter for converting stored digital information into analog signals, an A/D converter for converting stored analog information into digital signals, an amplifier and a switch. The audio data separated by the DSP of the separation circuit 4 are inputted into the audio-processing-portion/audio-storage-portion 30, converted from analog into digital data and stored in the memory, or converted from digital into analog and outputted as audio with the handset 31 via the amplifier. The audio inputted into the handset 31 is given into the audio-processing-portion/audio-storage-portion 30, passed through the amplifier and the A/D converter and stored, or sent to the multiplexing circuit 11 and transmitted over the telephone line via the modem 3 and the telephone line interface 2. The audio-processing-portion/audio-storage-portion 30 also includes an analog signal channel to the telephone line interface 2, and analog signals from the handset 31 can be processed as regular audio signals for the analog public telephone network, and passed through the switch after amplification with the amplifier. Furthermore, audio signals from the analog public telephone network can be processed and reproduced with the handset 31 after amplification with the amplifier. Consequently, the apparatus can also operate as a regular analog audio-only telephone.

The call detection portion 13 is composed of circuit components including a photo coupler, and detects alerting signals on the telephone line. The automatic answering control portion 14, which is realized by a microcomputer, receives the output from the call detection portion 13, determines whether there is an alerting signal, and controls all portions necessary for automatic answering. The automatic answering storage portion 15 is constituted by a storage circuit in the microcomputer of the automatic answering control portion 14, and stores whether automatic answering has been performed or not. The display continuation command portion 16, which is display continuation means, is realized by a program carried out on the microcomputer of the automatic answering control portion 14, and controls the display changeover switch 5, the display storage portion 6, and the image display portion 7 by changing the output from the I/O port of the display continuation command portion 16, such that image display is continued when the automatic answering storage portion 15 indicates that automatic answering has been performed. Here, "alerting signal" indicates a signal sent from a telephone exchange. When the telephone receives an alerting signal, it gives off an acoustic sound signalizing the incoming call.

Figure 2:
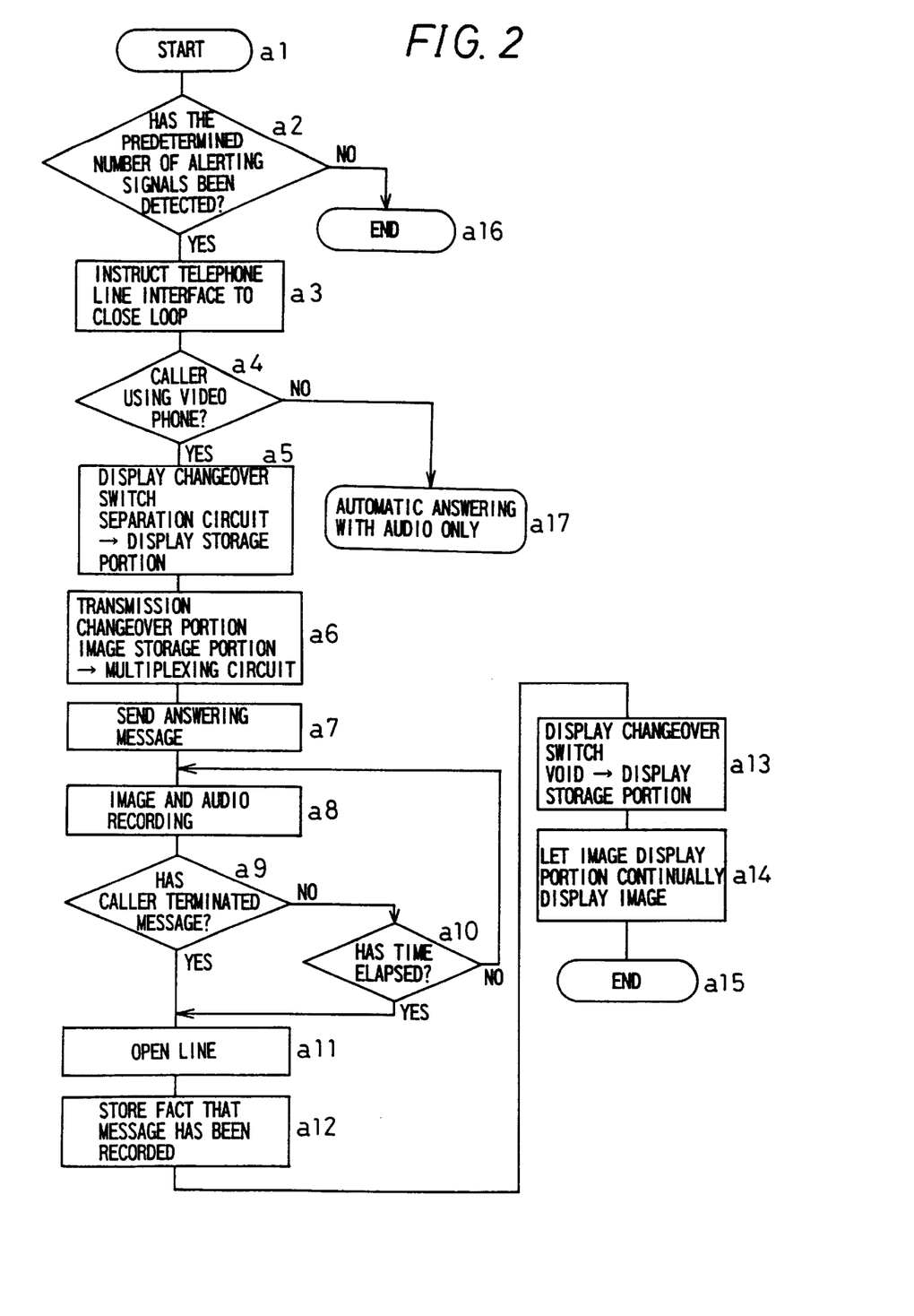
FIG. 2 is a flowchart illustrating a control procedure performed by a microcomputer of an automatic answering control portion.

FIG. 2 is a flowchart illustrating the procedure of the automatic answering operation performed by the microcomputer of the automatic answering control portion 14. When the automatic answering function of the apparatus has been activated, the automatic operation for incoming calls starting at step a1 is performed periodically. First, at step a2, the call detection portion 13 detects an alerting signal, which is inputted into the microcomputer. The microcomputer counts the number of detected alerting signals, and waits until a predetermined number of alerting signals has been detected in continuation. When a predetermined number of alerting signals has been detected, the procedure advances to step a3, where the microcomputer instructs the telephone line interface 2 to go off-hook, thus completing an electrical loop with the telephone line, and activates the modem 3. When a signal indicating a video telephone is detected, the modem 3 notifies the microcomputer of the fact that the caller is using a video telephone. Following the notification of the modem 3, at step a4, the microcomputer decides whether to perform automatic answering as a video telephone, or perform automatic answering with audio only.

When automatic answering is carried out as a video telephone, the microcomputer first carries out switching of the display changeover switch 5 at step a5, such that the output from the separation circuit 4 is inputted to the display storage portion 6. At step a6, the microcomputer carries out switching of the transmission changeover portion 10, such that an answering image to be transmitted to the calling video telephone when automatically answering incoming calls, which is stored in the image storage portion 12, is inputted into the multiplexing circuit 11. At step a7, the microcomputer lets the audio-processing-portion/audio-storage-portion 30 output an answering message such as "You have reached XXX at XXX-XXXX-XXXX . . . ", so that an answering message is outputted, as in conventional automatic answering machines.

At step a8, after this answering message and/or answering image have been transmitted, the microcomputer lets the audio-processing-portion/audio-storage-portion 30 and the image storage portion 12 start the image and audio recording. The image and audio recording is continued until the microprocessor determines at step a9, that the communication has been terminated, or until the microprocessor determines at step a10, that a predetermined period of time has elapsed. For the detection of the end of the communication at step a9, the modem 3 detects a communication end signal tone, and notifies the microcomputer of the same.

When it is determined at step a9 that the communication has been terminated, or when it is determined at step a10 that the predetermined period of time has elapsed, then the procedure advances to step a11, and the microcomputer lets the telephone line interface 2 open the loop with the telephone line. Since the audio recording and image recording have been performed at step a8, at step a12 the microcomputer stores the fact that a response by the automatic answering function has been made, in the automatic answering storage portion 15. Accordingly, at step a13, the microcomputer interrupts the input into the display changeover switch 5 with the display continuation command portion 16, so that the received image stored in the display storage portion 6 is not deleted. At step 14, the microcomputer causes the image display portion 7 to display continually the received image stored in the display storage portion 6. At step a15, the procedure is terminated.

Thereafter, in the case where a (new) second communication which continues thereafter is to be stored, the last image frame received from the second communication is similarly stored in the display storage portion 6 and displayed with the image display portion 7. In this situation, the image of the first communication has been stored in the display storage portion 6 and in the image storage portion 12 at the time of the first communication, and when the user returns home, the user can perform a key operation for displaying the received images of the other communications, and recognizing this key operation, the microcomputer reads out the last image frames stored for the respective communications from the image storage portion 12, to display them with the image display portion 7.

In addition to the operation as explained above, it is also possible to store received images preliminarily in the image storage portion 12, and then display an arbitrary image of the stored received images with the image display portion 7, as explained in the following. That is to say, it is possible to connect the output of the separation circuit 4 to the image storage portion 12 and store image data outputted from the separation circuit 4 in the image storage portion 12 during the communication. It is possible to select an arbitrary image frame of the image data outputted from the image storage portion 12, output it to the display changeover switch 5, and store it in the display storage portion 6. Consequently, it is possible to display an arbitrary image frame from among image frames received during the communication with the image display portion 7 by forwarding the arbitrary image frame to the display storage portion 6 after the communication has been terminated.

However, when the last frame received during the communication is displayed, then it is not necessary to store the images received during the communication in the image storage portion 12, so that the necessary memory is only that of the display storage portion 6, which means that only little memory is needed, and there is the advantage that the video telephone 1 can be produced at low cost. Putting it drastically, the image storage portion 12 for storing the images is not necessary, when no image transmission is performed during automatic answering, or only a monochrome image is sent, or the image captured by the camera is sent. This is, because the image received at automatic answering is stored in any case in the display storage portion 6.

The following is an explanation of the configuration of another embodiment of the invention, in which, when a plurality of incoming calls have been received by the video telephone 1, the same number of received images is stored in the display storage portion 6, and displayed simultaneously with the image display portion 7. For four communications, for example, the image area of each of the four images is reduced to ¼, the four images (two vertical× two horizontal) are stored in the display storage portion 6 so as to be displayed next to one another, and are displayed with the image display portion 7. In this manner, it is possible to display the images received in the course of a plurality of communications in one screen of the image display portion 7, and to improve the perspicuity of the communications, without increasing the storage capacity of the display storage portion 6.

Figure 3:
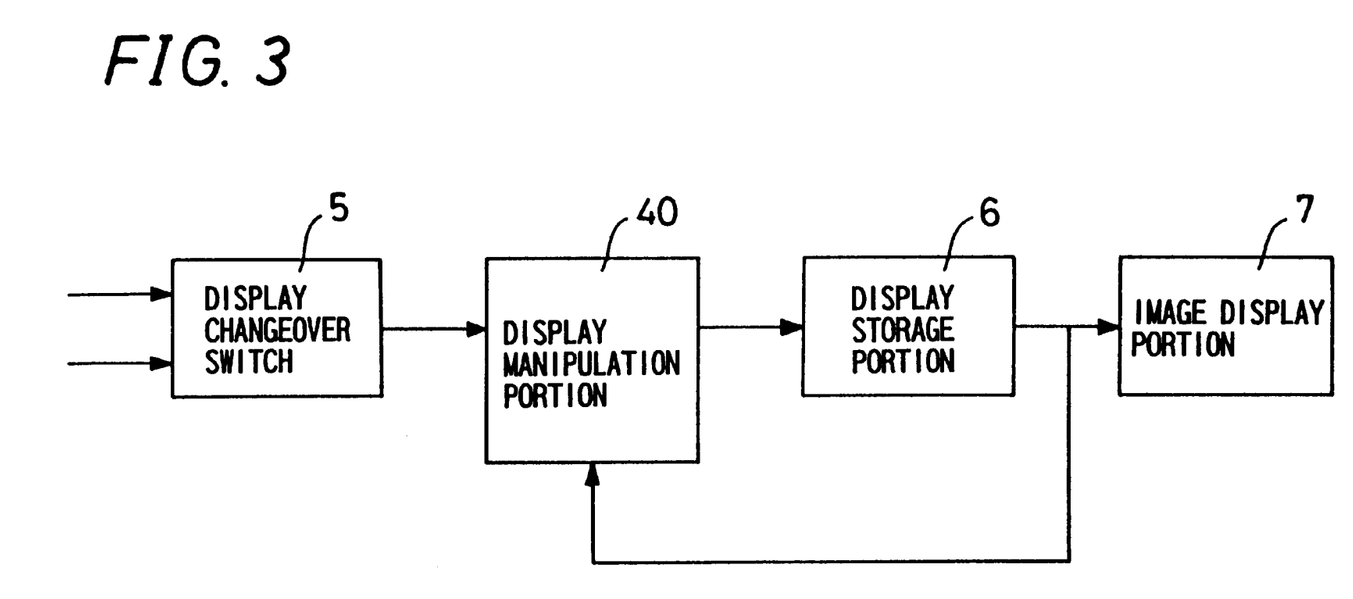
FIG. 3 is a block diagram illustrating the electrical configuration of main components of a video telephone in accordance with another embodiment of the invention.

FIG. 3 illustrates the configuration of the main components of this embodiment. FIG. 4 illustrates the principle of culling. In order to display, for example, four images on the image display portion 7 at the same time, empty space is formed in the display storage portion 6 and the image display portion 7 by reducing the information amount by compressing the images in a culling display operation to a quarter of the screen of the image display portion 7, that is, by reducing the storage data. The resulting empty space is used for another communication with the automatic answering function to be stored or displayed. By repeating this reduction and the storage into the resulting empty space, it is possible to store the last frames of a number of communications equal to the number of the partitions of the image display portion 7, and it is possible to store and keep the data of a plurality of recorded images in one display storage portion 6.

The display space is rectangular, with sides extending in vertical direction (first direction) and horizontal direction (second direction), the horizontal sides being longer than the vertical sides. The vertical direction coincides with the direction extending from top to bottom of the displayed images.

Figure 4A:
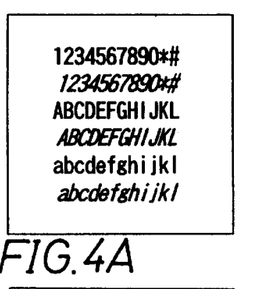
FIGS. 4A to 4I are views illustrating how, in the embodiment of FIG. 3, previously received images are culled in order to display a further more communication on the same screen.

As shown in FIG. 3, a display manipulation portion 40 serving as display manipulation means is arranged between the display changeover switch 5 and the display storage portion 6 in this embodiment. The display manipulation portion 40 is realized as a program in the DSP provided in the separation circuit 4. FIG. 4A illustrates the situation when an image received during a first communication is displayed in the display space, and visualizes schematically the image data stored in the display storage portion 6. When a second alerting signal is detected, and it is determined that the second alerting signal is from a video telephone, then the DSP writes every second point of pixel data while reading the data for each of pixels (pixel data) representing display contents of the display storage portion 6 from top left to top right, for example, in the order "1234567890". Indicating the written pixel data by underlining, the image data in the display storage portion 6 change as follows:

TABLE 1

1234567890
<u>1</u>234567890
<u>1</u>2<u>3</u>4567890

TABLE 1-continued

13*5*4567890
13*57*567890
13579*6*7890

Then, the right half is filled with blanks, so as to delete it from the display:

TABLE 2

13579_7890
13579 _890
13579 _90
13579 _0
13579 _

Figure 4B:
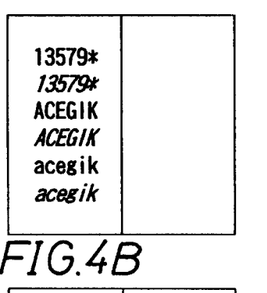
Figure 4C:
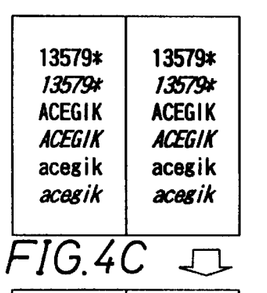

In this manner, the data for one line is compressed to half from left to right (that is, in horizontal direction). When this operation is performed for all lines, the image received in the first communication becomes as shown in FIG. 4B. It should be noted that the underlines in Tables 1 and 2 are shown for reasons of illustration, and do not reflect the actual storage contents of the display storage portion 6. FIG. 4C illustrates image data of the first communication after being culled and image data of a second communication which is written into the blank space that is generated by culling out the image data of the first communication, while being culled. It is also possible to omit the procedure of writing the blanks, and directly write the image received in the second communication.

Figure 4D:
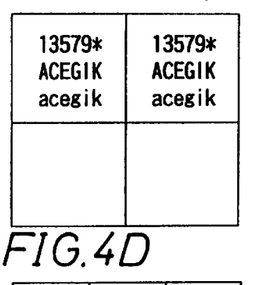
Figure 4E:
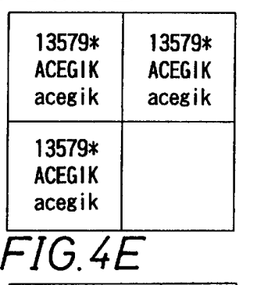
Figure 4F:
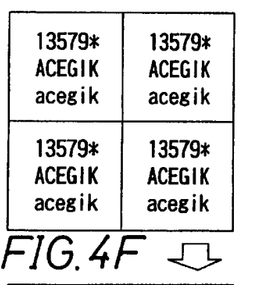

FIG. 4D shows a situation, when there was yet another communication, so that another image has to be displayed, and the vertical size of the image is compressed into half. This can be performed, for example, by culling out every two lines of the image data from top to bottom, and, after the last line has been culled out, shifting the remaining lines upward, and replacing the lines that have been shifted, with blanks. Thus, two blank spaces are generated. FIG. 4E illustrates the situation, when one of the blank spaces generated in FIG. 4D is filled with an image received in a third communication, while compressing this image vertically and horizontally in half. FIG. 4F illustrates the situation when the image data of yet another image have been written into the blank space.

Figure 4G:
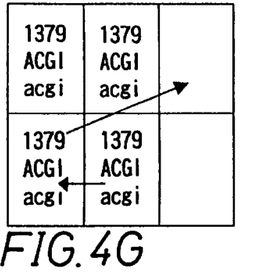

From FIG. 4A to FIG. 4F, the size of the images is compressed in half with respect to the vertical as well as the horizontal direction, but it is also possible to compress the size of the images into one third by writing only one out of each three image data points. Furthermore, it is also possible to compress the size of the images into two thirds by writing two out of each three image data points. That is to say, it is possible to compress the image data as desired. When there is another communication in the situation as shown in FIG. 4F, the image data is compressed by two thirds in horizontal direction, as shown in FIG. 4G, the display space is partitioned into six regions, and six screens for displaying six images are created, so that the number of images stored in the display storage portion 6 can be increased while displaying the images as large as possible with the image display portion 7. When m=4 images are displayed partitioned into n=2 partitions in horizontal direction, the images are compressed to n/(n+1)=⅔, the screen is partitioned into n=3 partitions in horizontal direction, and the fifth (m+1=5) image is stored in the newly generated blank space.

More specifically, the size of the images can be compressed uniformly to k/n, by partitioning the image data into a plurality of pixel data groups including n points of pixel data and writing k points of pixel data at predetermined positions in the pixel data groups into the image storage portion 6.

Figure 4H:
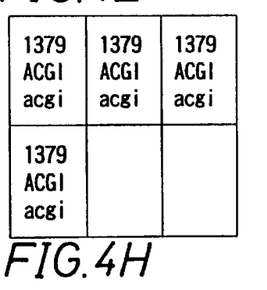
Figure 4I:
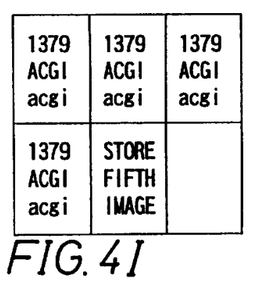

FIG. 4G illustrates how the images of FIG. 4F are compressed horizontally to two thirds, to form a display space for six images, forming blank spaces for two images in this display space. In this situation, images are displayed in the top left, top middle, bottom left and bottom middle of those two vertical×three horizontal display spaces, whereas the top right and bottom right spaces are blank, so that when no changes are made, new images will be displayed in the top right and the bottom right spaces. However, when the order of the images for the already stored communications becomes top left, top middle, bottom left and bottom middle, and a new image is displayed at the top right, the order in which the incoming calls have been received becomes difficult to grasp. Therefore, the images are rearranged as indicated by the arrow so that the chronological order in which they have been received becomes top left, top middle, top right, bottom left, bottom middle, and bottom right, so that the user will be less likely to confuse the chronological order in which the images have been received, and the images are presented to the user in an intuitive order. In other words, the image at the bottom left, which has been received in a third communication, is moved to the top right, the image at the bottom middle, which has been received in a fourth communication, is moved to the bottom left, and the bottom middle is filled with blanks. The result of this manipulation is shown in FIG. 4H. Then, the image of a fifth communication is stored in the display storage portion 6, such that it is displayed at the bottom middle, as shown in FIG. 4I.

In this embodiment, the processing for the automatic answering is performed with the microcomputer of the automatic answering control portion 14, and the processing for the image compression is performed by the DSP of the separation circuit 4, which controls the display manipulation portion 40, so that these processes can be performed independently, and efficient processing can be achieved. Moreover, the processing for the reduction of the information amount of the images and the processing for the compression of the size of the images, that is, the processing for the reduction of the display area of the images, can be carried out in a straightforward and quick manner by using the simple method of culling out data in horizontal and vertical direction of the image, without employing such complicated calculations as taking the average of neighboring pixel data.

When successively increasing the number of partitions of the display space to display more images, each image becomes increasingly smaller, so that when the screen is partitioned into an unlimited number of partitions, there is the danger that the perspicuity of the display is reduced. In order to prevent this, an upper limit should be set for the number of partitions, and no partitioning should be performed above this upper limit.

Figure 5:
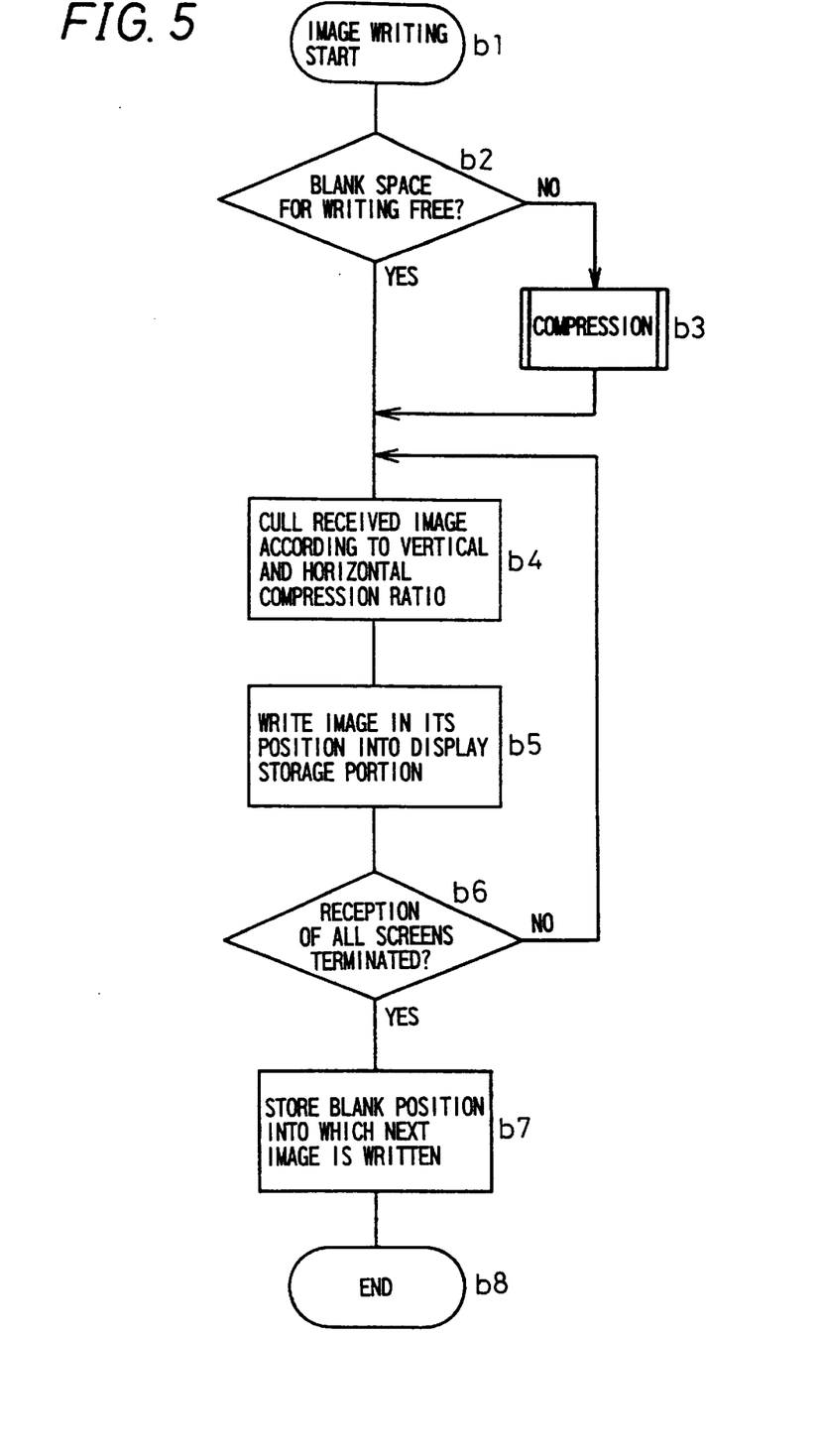
FIG. 5 is a flowchart illustrating an image writing procedure for a screen display as shown in FIGS. 4A to 4I.
Figure 6:
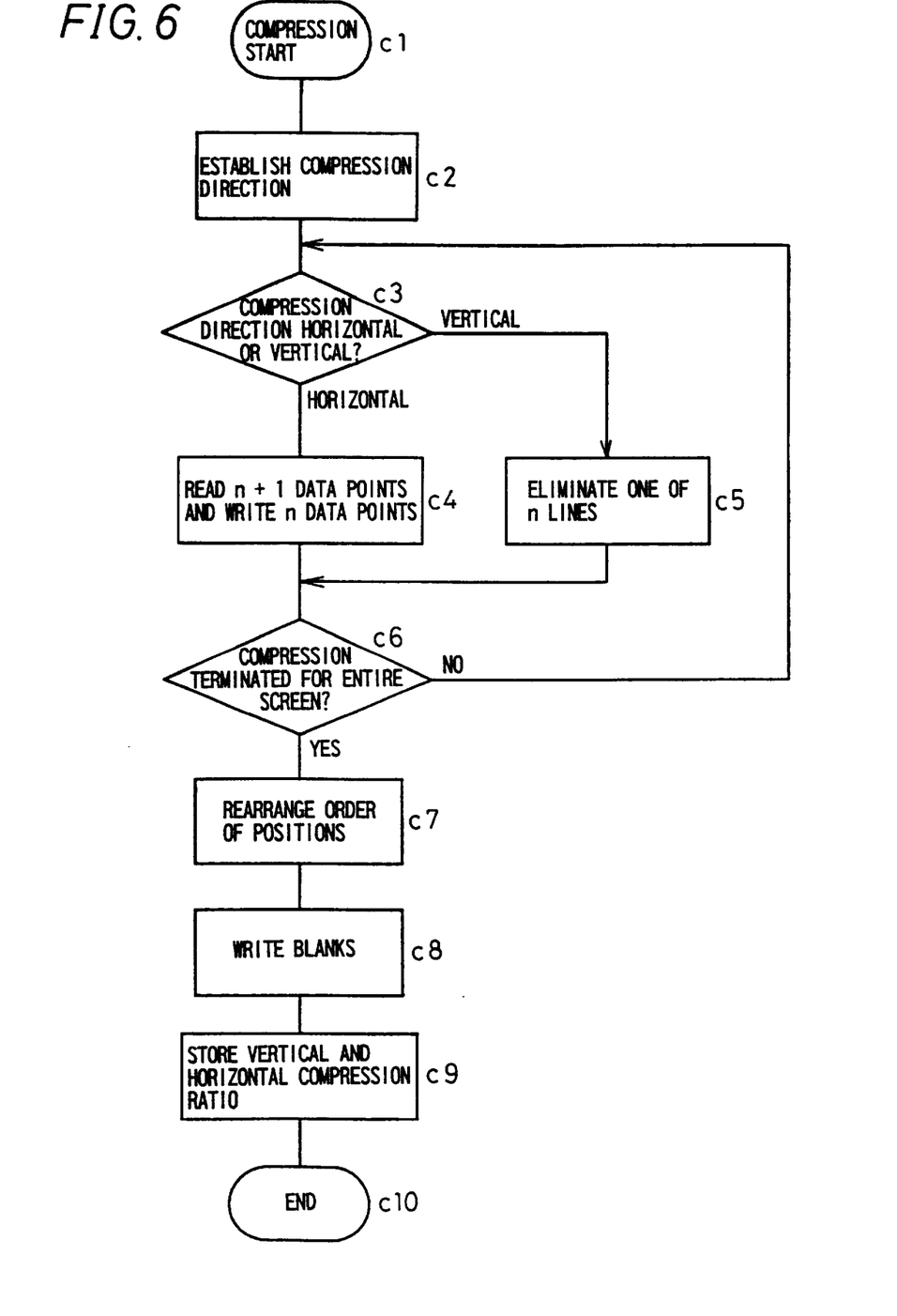
FIG. 6 is a flowchart illustrating an image compression procedure of step b3 in FIG. 5.

FIGS. 5 and 6 are flowcharts illustrating processing procedures for this embodiment. FIG. 5 illustrates the procedure for displaying and storing images received in a new communication while partitioning the screen as shown in FIGS. 4A to 4I. FIG. 6 illustrates the procedure for compressing the images in order to create blank spaces.

The image writing procedure of FIG. 5 starts with step b1. At step b2, the DSP determines whether there is blank space for writing a new image. In the case where the DSP judges that there is no blank space, at step b3, the DSP compresses the images displayed with the image display portion 7. In the case where the DSP judges at step b2 that there is blank space for writing, or in the case where blank space has been created as the result of the compression at step b3, at step b4, the DSP culls the newly received image in accordance with the vertical and horizontal compression ratio of the space it is to be written into. At step b5, the DSP writes the culled received image into its position in the display storage portion 6. At step b6, the DSP determines whether the reception of all screens of the received images has been terminated. In the case where the DSP judges that it has not been terminated, the procedure returns to step b4. In the case where the DSP judges at step b6 that the reception of all screens has been terminated, the procedure advances to step b7, at which the DSP stores the blank position into which the image received at the next communication is stored, in the display storage portion 6, the procedure advances to step b8, and is terminated.

FIG. 6 illustrates the procedure for the compression process of step b3 in FIG. 5. This procedure starts with step c1, and at step c2, the DSP establishes the compression direction of the image. At step c3, the DSP determines whether the compression direction is horizontal or vertical. When the compression direction is horizontal, the procedure advances to step c4, where the DSP reads n+1 data points for each line of the image data of the images and writes n of these n+1 data points into the display storage portion 6. In the case where, at step c3, the compression direction is judged as being vertical, the procedure advances to step c5, where the DSP eliminates one of the n lines. That is to say, at step c4, a compression by (n/(n+1)) in horizontal direction is performed, whereas at step c5, a compression by (n/(n+1)) in vertical direction is performed. After the compression, at step c6, the DSP determines whether the compression has been terminated for the image on the entire screen. In the case where it is judged at step c6 that compression has been not terminated, then the procedure returns to step c3. In the case where that compression is judged as having been terminated for the image on the entire screen, then, at step c7, the DSP performs the process of rearranging the order of the positions at which the received images are displayed, as explained for FIG. 4G. Then, at step c8, as shown in FIG. 4H, the DSP writes blanks into the positions that have become empty as a result of the positional changes. At step c9, the DSP stores the vertical and horizontal compression ratio of the image writing space after compression, into the display storage portion 6. The compression procedure is terminated at step c10.

In the above-described embodiments, images related to communications with the automatic answering function can be stored, and the display of these images on the image display portion 7 can be continued after the audio and image recording is terminated, so that the caller is displayed without any special operation by the user, and the user can identify the caller immediately when returning home. It is also possible to turn off the screen display of the image display portion 7, for example while the user is out, and to display images stored by the automatic answering function only after the user has reactivated the display of the image display portion 7 by operating a switch.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A video telephone having an automatic answering function in which automatic answering is made in response to an incoming call and at least an image of a calling side is reproducibly stored, the video telephone comprising:

display storage means for storing image display information during automatic answering; and display continuation means for controlling the display storage means such that image display is continued after a video telephone communication has been terminated.

2. The video telephone of claim 1, wherein the display continuation means controls the display storage means such that the display storage means stores and displays a received final image frame.

3. The video telephone of claim 1, wherein the video telephone further comprises display manipulation means for, in the case where a plurality of calls have been answered automatically and there is no empty display space for an image to be added to a continuous image display, in a storage space of the display storage means, producing available display space for the image to be added, in the display storage means by manipulating images received so far by automatic answering so as to reduce an information amount of the images, to store and display the image in the produced display space.

4. The video telephone of claim 3, wherein the display manipulation means reduces the information amount by directly culling image data stored in the display storage means.

5. The video telephone of claim 3, wherein the display manipulation means rearranges the displayed images after reducing the information amount thereof.

6. The video telephone of claim 5, wherein the images are rearranged in a chronological order.

7. The video telephone of claim 3, wherein the display manipulation means partitions the display space in a predetermined direction which is either a vertical direction or a horizontal direction into n partitions to display a plurality of m images, and in the case where a $(m+1)^{th}$ image newly received by the automatic answering function is to be displayed, the display manipulation means compresses all of the plurality of images by n/(n+1) to partition the display space into n+1 partitions with respect to the predetermined direction to enable the $(m+1)^{th}$ image to be displayed.

8. The video telephone of claim 3, wherein the display manipulation means partitions the display space in either a vertical direction or a horizontal direction into n partitions to display a plurality of m images, and in the case where a $(m+_1)^{th}$ image newly received by the automatic answering function is to be displayed, the display manipulation means produces available display space for the $(m+1)^{th}$ image in the display storage means by culling, with respect to the direction, one of n data points of each of the m images to compress the image in size to n/(n+1) in said direction, and partitioning the display space in that direction into (n+1) partitions, and compresses the $(m+1)^{th}$ image to the same size as that of the m images compressed to n/(n+1) in size, to store and display the compressed $(m+1)^{th}$ image in the available display space.

9. The video telephone of claim 8, wherein the display manipulation means partitions the display space into a preset maximum number of display partitions or less.

10. The video telephone of claim 8, wherein the display space is rectangular, with horizontal sides thereof being longer than vertical sides thereof, and the partitioning of the display space begins with partitioning in horizontal direction.

11. The video telephone of claim 10, wherein the partitioning of the display space is carried out in the horizontal direction and the vertical direction in alternation.

* * * * *